US010895989B2

(12) United States Patent
Ikeda et al.

(10) Patent No.: US 10,895,989 B2
(45) Date of Patent: Jan. 19, 2021

(54) MULTI-NODE STORAGE SYSTEM AND QUEUE CONTROL METHOD OF MULTI-NODE STORAGE SYSTEM

(71) Applicant: Hitachi, Ltd., Tokyo (JP)

(72) Inventors: Hajime Ikeda, Tokyo (JP); Atsushi Sato, Tokyo (JP); Takafumi Maruyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/522,768

(22) Filed: Jul. 26, 2019

(65) Prior Publication Data

US 2020/0174673 A1 Jun. 4, 2020

(30) Foreign Application Priority Data

Dec. 4, 2018 (JP) .................................. 2018-226940

(51) Int. Cl.
*G06F 12/00* (2006.01)
*G06F 3/06* (2006.01)

(52) U.S. Cl.
CPC ............ *G06F 3/0611* (2013.01); *G06F 3/067* (2013.01); *G06F 3/0655* (2013.01); *G06F 3/0688* (2013.01)

(58) Field of Classification Search
CPC ...... G06F 3/0611; G06F 3/0655; G06F 3/067; G06F 3/0688
See application file for complete search history.

(56) References Cited

U.S. PATENT DOCUMENTS

| 6,813,274 B1* | 11/2004 | Suzuki | H04L 49/101 |
| | | | 370/386 |
| 10,452,279 B1* | 10/2019 | Malwankar | G06F 3/0685 |
| 2010/0180070 A1* | 7/2010 | Kim | G06F 13/128 |
| | | | 711/103 |
| 2016/0283116 A1* | 9/2016 | Ramalingam | G06F 3/0611 |
| 2017/0177216 A1* | 6/2017 | Freyensee | G06F 3/0655 |
| 2019/0266117 A1* | 8/2019 | Duncan | G06F 13/24 |
| 2020/0174819 A1* | 6/2020 | Dong | G06F 9/45558 |

FOREIGN PATENT DOCUMENTS

WO 2017/158799 A1 9/2017

* cited by examiner

*Primary Examiner* — Prasith Thammavong
(74) *Attorney, Agent, or Firm* — Mattingly & Malur, PC

(57) ABSTRACT

Provided is a multi-node storage system including a plurality of nodes providing a volume to a computer as a logical storage area, each node including a controller that processes an I/O request from the computer, and including a plurality of NVMe drives PCI-connected to any one of the controllers of the node and a switch that connects the controllers of the plurality of nodes to each other, in which the controller includes a plurality of processors that process the I/O request from the computer and a memory, and the memory includes, for the plurality of NVMe drives, virtual queues which are equal in number to processors of a plurality of controllers constituting the multi-node storage system and real queues that store a command in any one of the plurality of NVMe drives and that are smaller in number than the virtual queues.

10 Claims, 14 Drawing Sheets

FIG. 13

| | 1301 | 1302 | 1303 | 1304 | 1305 | 1306 | 1307 | 1308 | 1309 |
|---|---|---|---|---|---|---|---|---|---|
| FOR NVMe DRIVE NUMBER ZZ | | | | | | | | | 2042 |
| MP NUM | USE VSQ/VCQ NUM. | USE SQ/CQ NUM. | NVMe CONNECTION DES. NUM. | Producer FOR VSQ | Consumer FOR VSQ | Producer FOR VCQ | Consumer FOR VCQ | REP. FLAG |
| 0 | 0 | 0 | 0(CONNECTED TO ITS OWN CTL) | 10 | 8 | 6 | 4 | ON |
| 1 | 1 | 1 | 0 | 15 | 15 | 15 | 15 | ON |
| 2 | 2 | 2 | 0(CONNECTED TO ITS OWN CTL) | 22 | 10 | 7 | 3 | ON |
| ... | ... | ... | ... | ... | ... | ... | ... | ... |
| XX | XX | 0 | 0(CONNECTED TO ITS OWN CTL) | 4 | 3 | 2 | 2 | OFF |
| XX+1 | XX+1 | 1 | 0(CONNECTED TO ITS OWN CTL) | 9 | 9 | 8 | 7 | OFF |
| XX+2 | XX+2 | 2 | 0(CONNECTED TO ITS OWN CTL) | 2 | 2 | 1 | 1 | OFF |
| ... | ... | ... | ... | ... | ... | ... | ... | ... |
| YY | YY | 0 | 1 (NOT CONNECTED TO ITS OWN CTL) | 0 | 0 | 0 | 0 | OFF |
| YY+1 | YY+1 | 1 | 1(NOT CONNECTED TO ITS OWN CTL) | 55 | 41 | 39 | 33 | OFF |
| YY+2 | YY+2 | 2 | 1(NOT CONNECTED TO ITS OWN CTL) | 13 | 12 | 7 | 3 | OFF |
| ... | ... | ... | ... | ... | ... | ... | ... | ... |

FIG. 14

STORAGE CONFIGURATION TABLE  2041

| LUN | NVMe DRIVE NUMBER |
|---|---|
| 0 | 1、2、3 |
| 1 | 5、6、7、8 |
| 2 | 10、11、12、YY |
| ... | ... |
| ... | ... |

MULTI-NODE STORAGE SYSTEM AND QUEUE CONTROL METHOD OF MULTI-NODE STORAGE SYSTEM

CROSS-REFERENCE TO RELATED APPLICATION

The present application claims priority from Japanese application JP2018-226940, filed on Dec. 4, 2018, the contents of which is hereby incorporated by reference into this application.

BACKGROUND OF THE INVENTION

1. Field of the Invention

The present invention relates to a multi-node storage system and a queue control method of a multi-node storage system.

2. Description of the Related Art

Usually, in a storage device with a plurality of processors or a plurality of processor cores, it is necessary to process queue control of processing a drive while performing exclusion control among a plurality of processors.

In recent years, storage devices that use a high-performance NVMe drive in which a flash memory is mounted on a drive as a storage medium of a storage device have been developed. According to the standard, in the NVMe drive, it is possible to provide up to about 64 K queues for processing commands through a channel control function. As a technique to pursue high performance using a plurality of queues which is a feature of an NVMe in consideration of queue exclusion control, there is a technique disclosed in WO 2017/158799 A.

A technique to pursue a high processing speed by generating queue groups which are equal in number to processors for one storage device is disclosed in WO 2017/158799 A.

According to the standard, 64 K queues for managing NVMe drives can be generated, but the number of queues actually provided by a drive vendor is about 128. If queues which are equal in number to processes are generated for one storage device as in the technique disclosed in WO 2017/158799 A, the queue is likely to be depleted.

Also, the technique disclosed in WO 2017/158799 A is on the premise that all processors are PCI-connected to the NVMe drives and access the queues of the NVMe drives, but a multi-node storage system in which a plurality of storage devices are connected via a network is not sufficiently taken into account. That is, in the multi-node storage system such as a software defined storage (SDS) or a hyper converged infrastructure (HCI environment), the number of processors that process an access request to the drive increases dramatically as compared with a storage device of a related art. Therefore, the number of processors is likely to be larger than the number of queues, and the technique disclosed in WO 2017/158799 A is unable to be applied.

Also, since the queue of the NVMe can only be operated by the processor which is PIC-connected, the queue is unable to be operated from processors of other storage devices connected to a network as in the multi-node storage system. Therefore, it is necessary to transfer an I/O request from a storage device that has received the I/O request to another storage device to which the driver storing data which is an access destination of the I/O request is PIC-connected.

That is, it is necessary to transfer the I/O request using a logical address such as a LUN between a storage device of a transfer source and a storage device of a transfer destination. Therefore, in order to specify the drive of the access destination in the storage device of the transfer source, two address translations, that is, an address translation for specifying a drive of an actual data storage destination from a logical address such as a LUN and an address translation from a logical address such as a LUN to an actual drive in the storage device of the transfer destination that has received the I/O request from the storage device of the transfer source are necessary.

SUMMARY OF THE INVENTION

In this regard, it is an object of the present invention to provide a multi-node storage system and a queue control method of a multi-node storage system which are capable of improving I/O performance without depleting the queue even when the number of processors performing I/O processing increases.

It is another object of the present invention to provide a multi-node storage system and a queue control method of a multi-node storage system which are capable of improving I/O performance in a multi-node storage system in which a plurality of storage devices are connected via a network.

In order to achieve the above objects, a multi-node storage system according to one aspect of the present invention is a multi-node storage system including a plurality of nodes providing a volume to a computer as a logical storage area, each node including a controller that processes an I/O request from the computer, and the multi-node storage system includes a plurality of NVMe drives PCI-connected to any one of the controllers of the node and a switch that connects the controllers of the plurality of nodes to each other, in which the controller includes a plurality of processors that process the I/O request from the computer and a memory, and the memory includes, for the plurality of NVMe drives, virtual queues which are equal in number to processors of a plurality of controllers constituting the multi-node storage system and real queues that store a command in any one of the plurality of NVMe drives and that are smaller in number than the virtual queues.

According to the present invention, it is possible to prevent degradation in I/O processing performance caused by exclusion control of a queue of an NVMe even when the number of processors performing I/O processing increases.

Also, it is possible to improve I/O processing performance in a multi-node storage system environment.

BRIEF DESCRIPTION OF THE DRAWINGS

FIG. 13 is a diagram illustrating a queue management table; and

FIG. 14 is a diagram illustrating a storage configuration table.

DETAILED DESCRIPTION OF THE PREFERRED EMBODIMENTS

Figure 1:
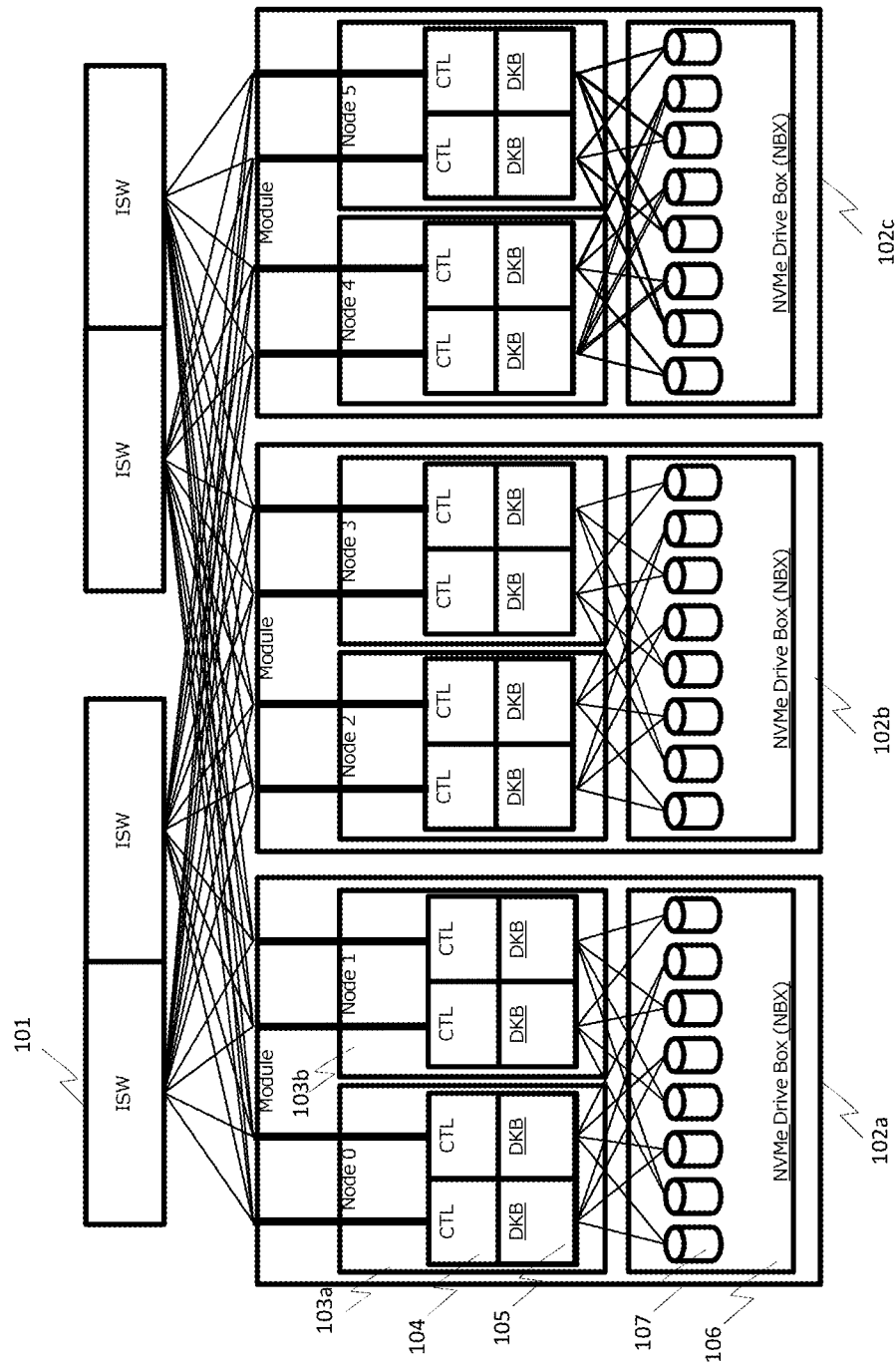
FIG. 1 is a system configuration diagram.

An exemplary embodiment will be described with reference to the appended drawings. Note that an embodiment to be described below does not limit the invention related to claims set forth below, and all of elements described in an embodiment and combinations thereof are not intended to be essential for the solutions of the invention.

In the following description, there are cases in which information is described by an expression "AAA table," but information may be expressed by any data structure. That is, the "AAA table" can be written as "AAA information" to indicate that information does not depend on a data structure.

Also, in the following description, [MP] includes one or more processors. At least one processor is typically a central processing unit (CPU). The processor may include a hardware circuitry that performs some or all of processes.

Also, in the following description, the process in which a "program" is described an entity of an operation may be mentioned in some cases, but since the program is executed by an MP (for example, a CPU) to perform a predetermined process while using a storage resource (for example, a memory) or the like appropriately, an actual entity of the process is the MP. Therefore, the process in which the program is described as the entity of the operation may be a process performed by a device including a processor. Further, a hardware circuitry that performs some or all of processes performed by the processor may be included. A computer program may be installed in a device from a program source. The program source may be, for example, a program distribution server or a computer readable storage medium.

<Overview>

In the present technology, in a multi-node storage system environment such as a software defined storage (SDS) or a hyper converged infrastructure (HCI environment), the number of processors (MPs) increases, and thus the number of MPs is considered to be larger than the number of queues that control the NVMe drive.

In this case, one queue is shared by a plurality of MPs, and exclusion control of an operation of a queue is necessary between MPs. The I/O processing performance is likely to degrade due to the exclusion control.

Also, the queues (SQ and CQ) of the NVMe drive can be operated only from the MP physically connected with the NVMe drive via a PCI. Therefore, in the multi-node storage system such as the SDS or HCI in which a plurality of storage devices are connected via a network, a process of translating address information included in an I/O is necessary in order to access the NVMe drive from other storage devices connected via a network. In other words, the address information translation process is necessary to specify the storage device to which the I/O is to be transferred and the NVMe drive to be accessed from the address information (for example, the LUN) included in the I/O.

However, since recent storage devices are managed by a plurality of virtual address layers, if the translation process from a LUN or the like specifying an access destination included in the I/O to a drive in which data is actually stored is performed in response to all I/O requests, a large number of processes are necessary.

If the address translation is performed in response to all I/O requests, processing performance is likely to degrade.

The present technology can improve the I/O processing performance by making the queue exclusion control unnecessary by disposing virtual queues (VSQ and VCQ) corresponding to respective MPs separately from the queues (SQ and CQ) disposed in the NVMe drive in the multi-node storage environment.

Also, in the multi-node storage system in which a plurality of storage devices are connected via a network, only when cache miss occurs, a command is transferred (cross-transferred) to a storage device to which a NVMe drive serving as an access destination is connected, and thus the I/O processing performance can be improved.

<Explanation of Terminology>

Non-volatile memory express (NVMe): a logical device interface standard for connecting a non-volatile storage medium (SSD) via a PCI Express.

Submission queue (SQ): a queue for storing commands to an NVMe drive.

Completion queue (CQ): a queue for storing responses from an NVMe drive. One SQ and one CQ form a pair.

In this specification, the SQ and the CQ are called real queues.

Virtual submission queue (VSQ): a virtual SQ allocated to each MP.

Virtual completion queue (VCQ): a virtual CQ allocated to each MP.

In this specification, the VSQ and the VCQ are called virtual queues.

Intelligent system switch (ISW): a switch for connecting a storage module controller (CTL).

DKB: a board for connecting the CTL and the NVMe drive.

MP number: an identifier specifying an MP in a storage system.

Use VSQ/VCQ number: a VSQ/VCQ number uniquely allocated to an MP.

Use SQ/CQ number: a SQ/CQ number to be used when a command with the NVMe drive is actually transferred.

VSQ producer: an index for managing to what extent commands have been stored in the VSQ.

VSQ Consumer: an index for managing to what extent commands stored in the VSQ have been reaped.

VCQ producer: an index for managing to what extent commands have been stored in the VCQ.

VCQ Consumer: an index for managing to what extent commands stored in the VCQ have been reaped.

Representative flag: information for managing that it is an MP representatively storing a request from the VSQ to the SQ (or from the CQ to the VCQ) in a polling process.

<System Configuration>

First, a multi-node storage system according to an embodiment of the present invention will be described.

FIG. 1 is a system configuration diagram of one embodiment.

A plurality of modules 102a, 102b, and 102c are connected to one another via an intelligent system switch (ISW) 101. Each module 102 accommodates two nodes 103, and each node 103 accommodates two controllers 104. Each controller 104 is configured to be connected to another controller of the same node 103, a controller of another node of the same module, or a controller of another module via the ISW 101.

Each controller is connected to a board DKB 105 for connecting to a plurality of NVMe drives 107. A plurality of NVMe drives 107 are accommodated in an NVMe drive box 106, and one or more NVMe drive boxes 106 are connected to each node 103 to constitute one module 102. Each controller 104 is connected to a computer such as a server (not illustrated) via a network and processes an I/O request from the computer. Hereinafter, in this specification, the NVMe drive is also abbreviated as simply a drive.

One or more NVMe drive boxes 106 may be installed in the module 102 or may be connected externally to the module 102. Each node 103 corresponds to a storage device and provides one or more logical storage areas to the computer as a volume.

The volume is constituted by a plurality of logical blocks. A logical block size in the present embodiment is, for example, the same size as a management unit of Thin Provisioning (volume virtualization) of allocating a physical block to a logical block at the time of writing. Note that the logical block need not have the same size as the management unit of the Thin Provisioning. A plurality of physical blocks are formed on the basis of a storage area of the NVMe drive 107 which is a storage device. A physical block is allocated to the logical block of the volume.

The multi-node storage system illustrated in FIG. 1 illustrates an example in which the computer and the module 102 are separately configured, but the computer and the module 102 or the node 103 may be configured using one bare metal (physical computer). For example, each of the computer and the node 103 may be a virtual computer called a virtual machine (VM) operating on the same computer or may be a container configured by container virtualization.

Although FIG. 1 illustrates an example in which one module is constituted by two nodes, the number of nodes included in one module may be three or more. Also, although FIG. 1 illustrates an example in which each node includes two controllers, the number of controllers included in a node may be three or more.

Next, a hardware configuration of the node (storage device) 102 will be described.

Figure 2:
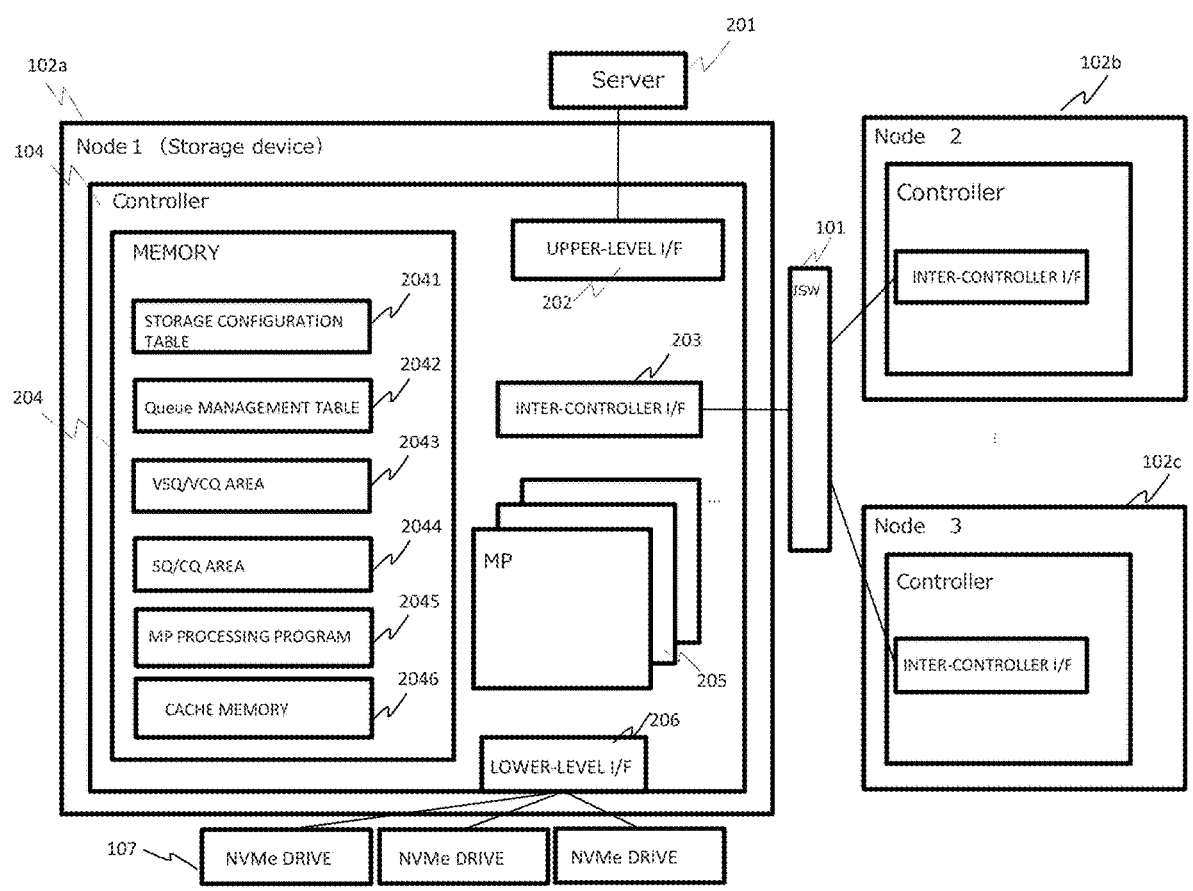
FIG. 2 is a system block diagram.

FIG. 2 is a system block diagram of the node 102 (storage device) according to an embodiment.

The storage device 102 includes the controller 104 that performs a process of processing the I/O request from a computer such as server and storing data in the NVMe drive 107 or reading data from the NVMe drive 107 and transmitting the data to the computer, and one or more NVMe drives 107. In FIG. 2, the NVMe drive box and one of the controllers are omitted.

The controller 104 includes an upper-level I/F 202 connected with a computer 201 such as a server, an inter-controller I/F 203 connected with the controllers of the other nodes via the ISW 101 in accordance with the NVMe, a plurality of processors (MPs) 205, a lower-level I/F 206 for connecting to the NVMe drive 107, and a memory 204. The inter-controller I/F 203 connects the controller to another controller of the same node 103, a controller of another node of the same module, or a controller of another module.

The memory 204 stores a storage configuration table 2041 indicating a relation between the volume provided from the node to the computer and the NVMe drive, a queue management table 2042, and an MP processing program 2045 for realizing various types of processes executed by the controller, and includes a VSQ/VCQ area 2043 for setting the VSQ or the VCQ, an SQ/CQ area 2044 for setting the SQ or the CQ, and a cache memory area 2046 serving as a cache memory for temporarily storing data related to the I/O.

FIG. 14 illustrates the storage configuration table 2041 stored in the memory 204. In the storage configuration table 2041, for example, a LUN 1401 which is information for identifying a volume provided from the node to the computer is managed in association with a number 1402 of the NVMe drive in which data is actually to be stored or stored.

Although the LUNs and the drive numbers are illustrated as being directly associated with each other in FIG. 14, actually, there may be a layer of managing a plurality of addresses such as a pool of managing a virtual volume or a volume of each drive between the LUN and the driver number. In the present embodiment, description of various types of address management layers existing in the middle thereof is omitted, and the storage configuration table will be described using a correspondence relation between a LUN number which is designated by the computer such as the server through the I/O request and a physical NVMe drive used when an I/O request including a LUN number is executed as minimum information.

Therefore, the NVMe drive number written in the storage configuration table in association with the LUN can be understood as, for example, a drive constituting a RAID group. Also, as the storage configuration table, information for managing a relation between a LU and a drive such as a plurality of types of RAIDs, a data protection technology of eraser coding (EC), pairing between two LUNs, mirroring, or remote copy (RC) can be used.

The main processor (MP) 205, the memory 204, the upper-level I/F 202, the inter-controller I/F 203, and the lower-level I/F 206 are connected via, for example, an internal bus or an external bus.

As the MP 205 executes a program stored in the memory, the controller performs a predetermined process with reference to various types of information stored in the memory. Therefore, the entity of the actual process is the MP, but for the sake of description, the program is also described as the entity of the operation. In this case, the MP performs each process. A hardware circuitry that performs some or all of processes performed by the processor may be included.

Figure 3:
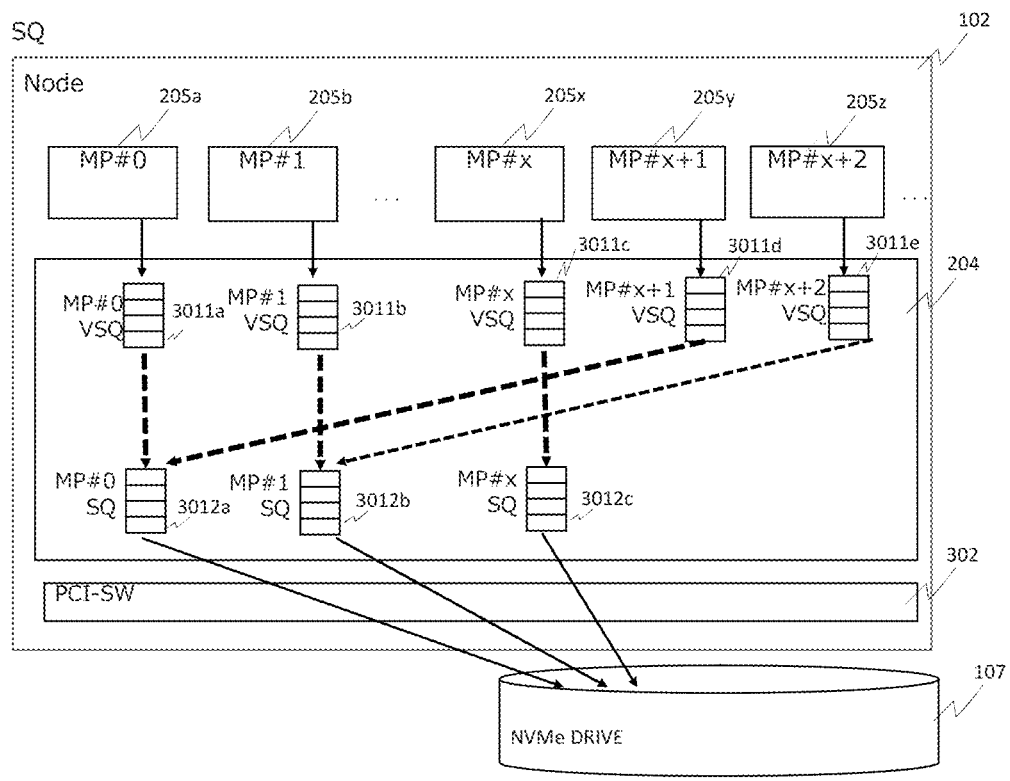
FIG. 3 is a diagram for describing SQ (request) control via a virtual queue VSQ by a representative MP.

Next, SQ (request) control via the virtual queue VSQ by the representative MP executed in the node 102 will be described using FIG. 3.

The node 102 includes a plurality of MPs 205, the memory 204, and a PCI-SW 302, and accesses the NVMe drive 107. The PCI-SW 302 is disposed between the lower-level I/F 206 and the NVMe drive 107 in FIG. 2.

The memory 204 includes an area of the VSQ which is a virtual queue and an area of the SQ which is a queue for storing a command for the NVMe drive, a VCQ 3011 which is a virtual queue is allocated to each MP 205, and the memory 204 operates in accordance with an NVMe protocol. For example, a VSQ 3011a of a VSQ number [0] is allocated to an MP 205a of an MP number [0], and a VSQ 3011c of a VSQ number [x] is allocated to an MP 205x of an MP number [x].

Each VSQ is associated with a queue SQ 3012 for storing a command for the NVMe drive. For example, the VSQ 3011a and the VSQ 3011c correspond to the SQ 3012a of the SQ number [0]. The command stored in the SQ 3012 is reaped and processed by the NVMe drive 107. A correspondence between the VSQ and the SQ is managed by the queue management table managed for each drive illustrated in FIG. 13.

FIG. 13 is a diagram illustrating the queue management table. The queue management table 2042 illustrated in FIG. 13 is information for each NVMe drive, and in a multi-node storage system including a plurality of NVMe drives, a plurality of queue management tables are managed for each NVMe drive. FIG. 13 illustrates a queue management table for an NVMe drive number [ZZ] in the NVMe drive.

An MP number 1301 allocated to each MP through the storage system, a VSQ/VCQ number 1302 used by each MP, a use SQ/CQ number 1303 used by the MP, an NVMe connection destination CTL number 1304 which is information of the controller to which the NVMe drive number [ZZ] is PCI-connected, a VSQ producer 1305 which is an index for managing to what extent data is stored performed in the VSQ, a VSQ Consumer 1306 which is an index for managing to what extent the VSQ is reaped, a VCQ producer 1307 which is an index for managing to what extent data is stored in the VCQ, a VCQ Consumer 1308 which is an index for managing to what extent the VCQs are reaped, and a representative flag 1309 which is information indicating whether it is a representative MP that stores a request from the VSQ to the SQ or from the CQ to the VCQ in the polling process are managed in association with one another.

For example, the VSQ/VCQ number 1302 of [0], the SQ/CQ number 1303 of [0], the NVMe connection destination CTL number 1304 of [0], the VSQ producer 1305 of [10], the VSQ Consumer 1306 of [8], the VCQ producer 1307 of [6], the VCQ Consumer 1308 of [4], and the representative flag 1309 of [ON] are managed in association with the MP number 1301 of [0]. Here, the NVMe connection destination controller number 1304 stores [0] when the NVMe drive managed by the queue management table 2042 is directly PCI-connected to the controller and stores [1] when the NVMe drive is connected to another controller which is not directly PCI-connected.

If the controller 104 receives the I/O request, the controller 104 can specify the NVMe drive that stores data of an access destination from virtual address information such as a LUN included in the I/O request with reference to the storage configuration table 2041 of FIG. 14 and refer to the queue management table 2042 managed for each NVMe drive from the information of the specified NVMe drive. This operation is realized as the MP 205 processes the content of the MP processing program 2045.

Since the VSQ which is a virtual SQ allocated to each MP is disposed as described above, exclusion control between the MPs becomes unnecessary, and the I/O processing performance can be improved in the multi-node storage environment with a large number of MPs.

Figure 4:
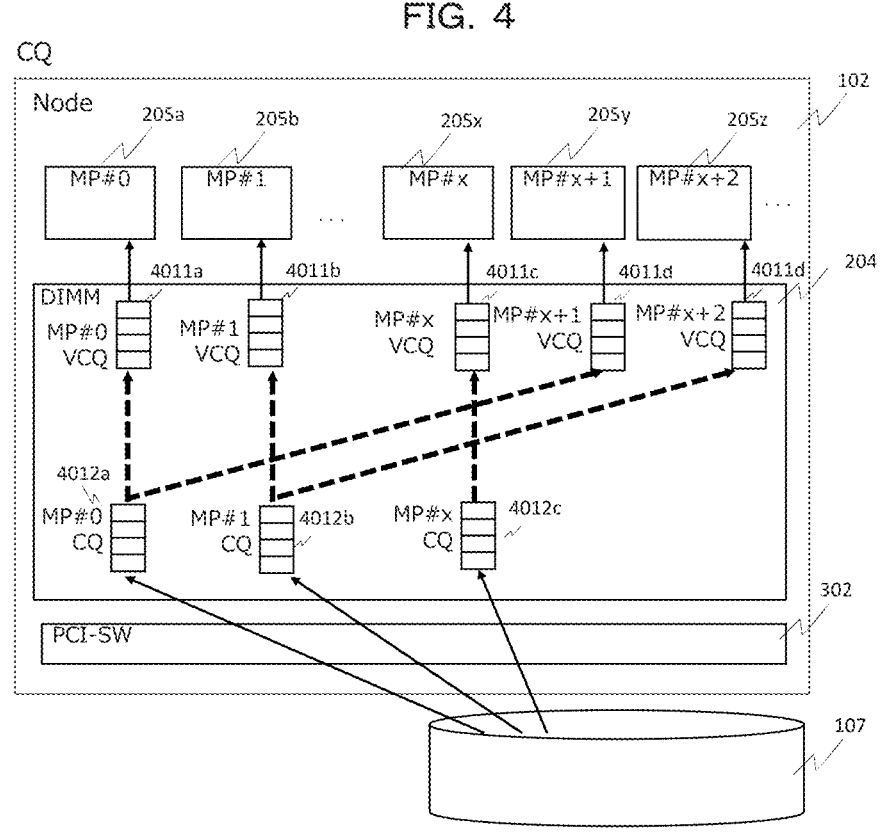
FIG. 4 is a diagram for describing CQ (response) control via a virtual queue VCQ by a representative MP.

FIG. 4 is a diagram for describing CQ (response) control via the virtual queue VCQ by the representative MP.

The memory 204 includes an area of a VCQ 4011 which is a virtual queue and an area of a CQ 4012 which is a queue for storing the response from the NVMe drive, and a VCQ 4011 which is one virtual queue is allocated to each MP 205. For example, a VCQ 4011a is allocated to an MP 205a of an MP number [0].

A queue CQ 4012 for storing the response from the NVMe drive in accordance with the NVMe is associated with each VCQ. The command stored in the CQ 4012 is reaped and processed by the representative MP 205. A correspondence between the VCQ and the CQ is managed by the queue management table managed for each drive illustrated in FIG. 13.

Since the VCQ which is a virtual CQ allocated to each MP is disposed as described above, exclusion control between the MPs becomes unnecessary, and the I/O processing performance can be improved in the multi-node storage environment with a large number of MPs.

<Storage Transfer Operation>

Figure 5:
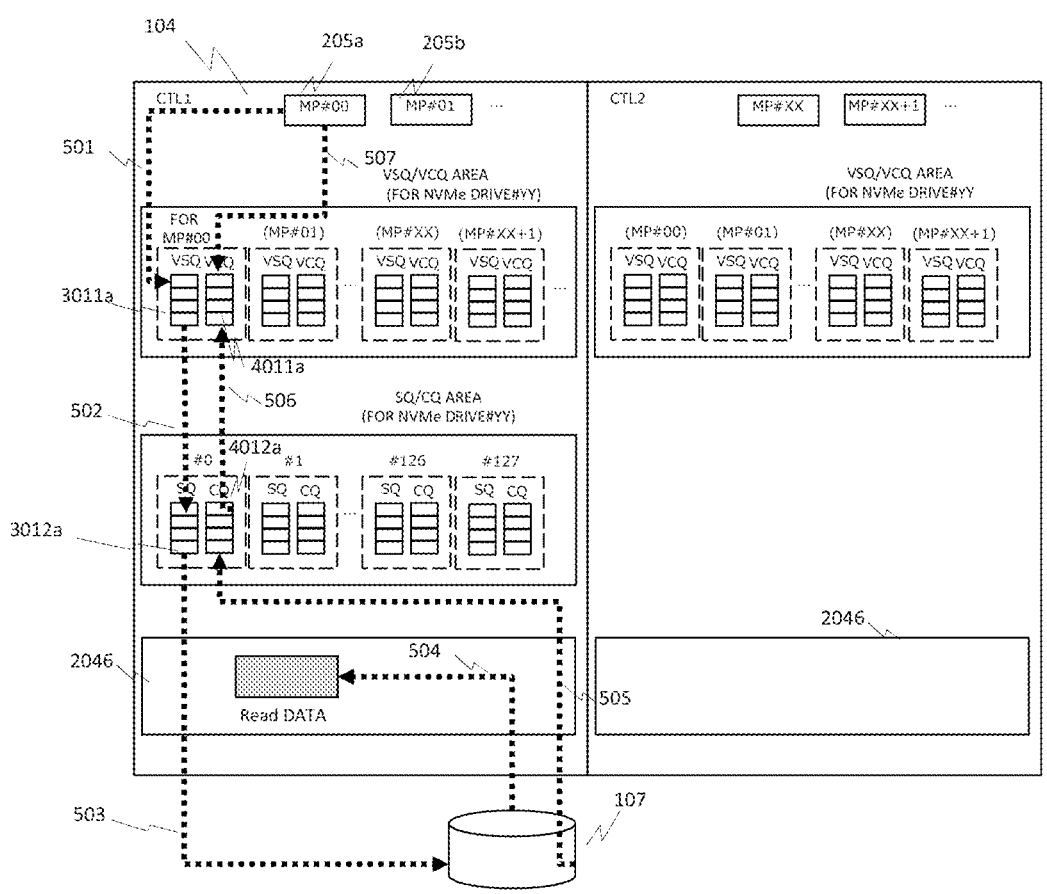
FIG. 5 is a diagram for describing an operation (straight) at the time of reading.

FIG. 5 is a diagram for describing an operation (storage transfer) at the time of reading. Here, the storage transfer refers to a case in which an MP that processes the I/O is PCI-connected with the NVMe drive 107 serving as an I/O access target.

Note that pairs of VSQ and VCQ which are equal in number to MPs accommodated in the controller of the multi-node storage system are prepared in the memory 204. A pair of SQ and CQ is prepared in the memory 204 of the controller 104 to which the NVMe drive 107 is PCI-connected. In addition, in the currently available NVMe drive 107, a pair of SQ and CQ can be created as many as queues supported by the NVMe drive 107 per NVMe drive 107.

Dotted lines in FIG. 5 indicate movement of data and a command in accordance with the NVMe.

First, an MP [00] 205a of a controller 1 (104) stores an I/O request (read request) command in the VSQ 3011a allocated to itself in accordance with the NVMe (501). The MP [00] 205a is an MP that receives an I/O request handed over from an upper-level I/F and processes the I/O.

A read command stored in the VSQ is reaped by the representative MP and stored (enqueued) in the SQ (502). The representative MP is an MP in which the representative flag illustrated in FIG. 13 is set. A process of deciding the representative MP will be described later.

A read command enqueued in the SQ is reaped by the NVMe drive 107 (503) and executed. The read command is executed by the drive 107, and read data is stored in the cache memory area 2046 of the memory (504). The NVMe drive 107 stores a completion response indicating that the read request command has been executed in a CQ 4012a (505).

The representative MP enqueues the completion response stored in the CQ 4012a in the VCQ 4011a for the MP 205a (506). The MP 205a reaps the completion response enqueued in the VCQ 4011a (507), and reads out the data stored in the cache memory area 2046.

Note that, although the read command has been described in FIG. 5, a similar operation is performed even in the case of an Admin command which is a management command.

<Cross Transfer Operation>

Figure 6:
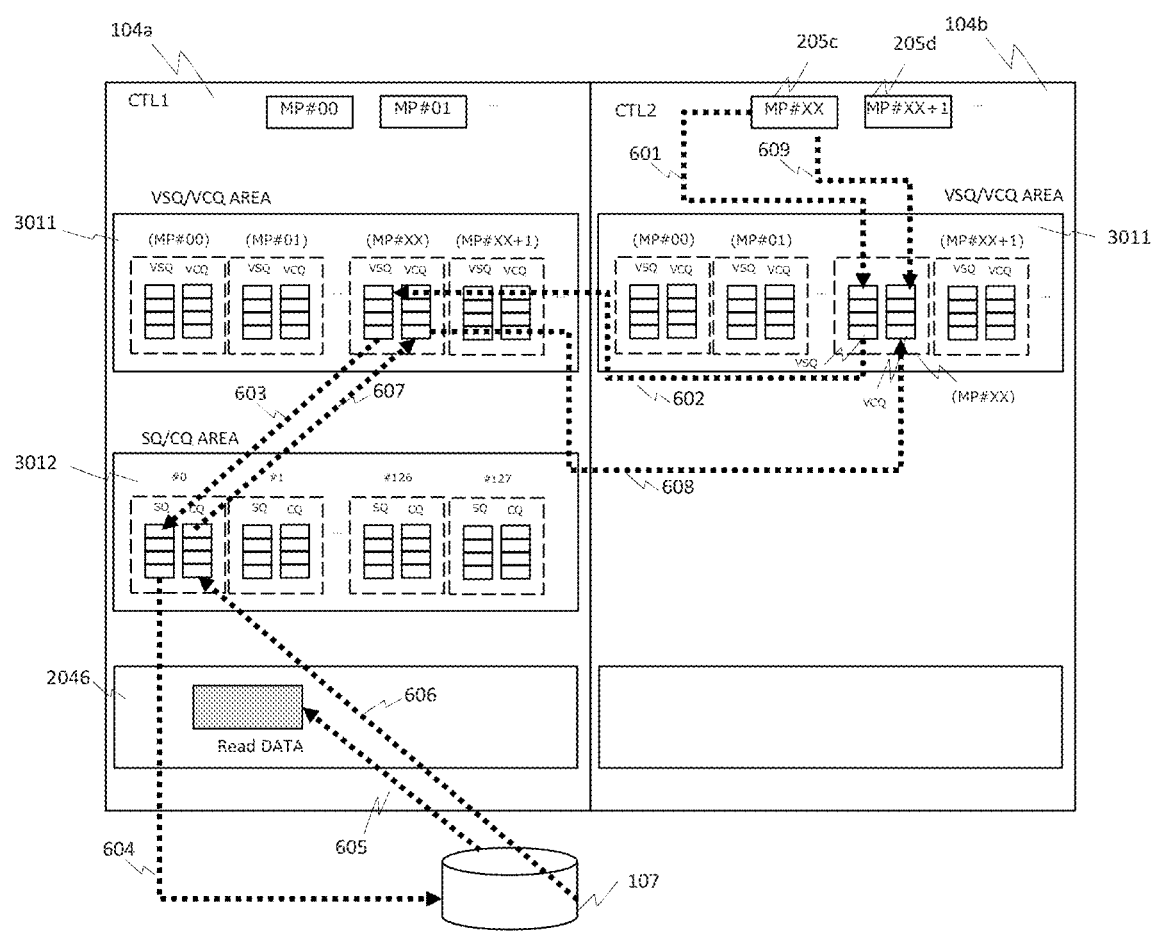
FIG. 6 is a diagram for describing an operation (cross) at the time of reading.

FIG. 6 is a diagram for describing an operation (cross) at the time of reading. The cross transfer is an operation in which processing of the read command straddles different controllers, and refers to a so-called processing request operation to other systems. Therefore, in the multi-node storage system, other system processes serving as the cross transfer also includes a case in which a controller of a different module as well as a different control of the same node performs I/O processing.

If an MP 205c of a controller 2 (104b) receives the I/O request from the computer, the read command is stored in the VSQ 3011 (for the MP number XX) allocated to itself (601). The representative MP of the controller 104b reaps the read command stored in the VSP, and cross-transfers and enqueues it in the VSQ of the other system controller 104a to which the NVMe drive 107 storing the data is connected (602). The representative MP of the controller 1 (104*a*) enqueues the command stored in the VSQ in the SQ (603).

The command stored in the SQ 3012 is reaped by the NVMe drive 107 (604) and executed. The read command is executed by the NVMe drive 107, and the read data is stored in the cache memory area 2046 of the memory (605). The NVMe drive 107 stores the completion response indicating that the read request command has been executed in the CQ (606).

The representative MP of the controller 1 enqueues the completion response stored in the CQ in the VCQ for the MP (607). It is cross-transferred and enqueued in the VCQ of the controller 2 (608). The MP 205*c* reaps the completion response enqueued in the VCQ (609), and reads out the data stored in the cache memory.

Since the VSQ which is a virtual SQ allocated to each MP is disposed for all the MPs of the multi-node storage system as described above, the exclusion control between MPs becomes unnecessary, and the I/O processing performance can be improved in the multi-node storage environment with a large number of MPs.

Note that, although the read command has been described in FIG. 6, a similar operation is performed even in the case of an Admin command which is a management command.

As described above, in the case of the cross transfer, for the virtual queue of the storage device of the transfer destination, it is not necessary to perform the address translation in the storage device of the transfer destination as compared with the I/O request using the virtual address such as the LUN between the storage devices connected via the network, and thus the I/O processing performance can be improved.

<Storage Transfer Sequence>

Figure 7:
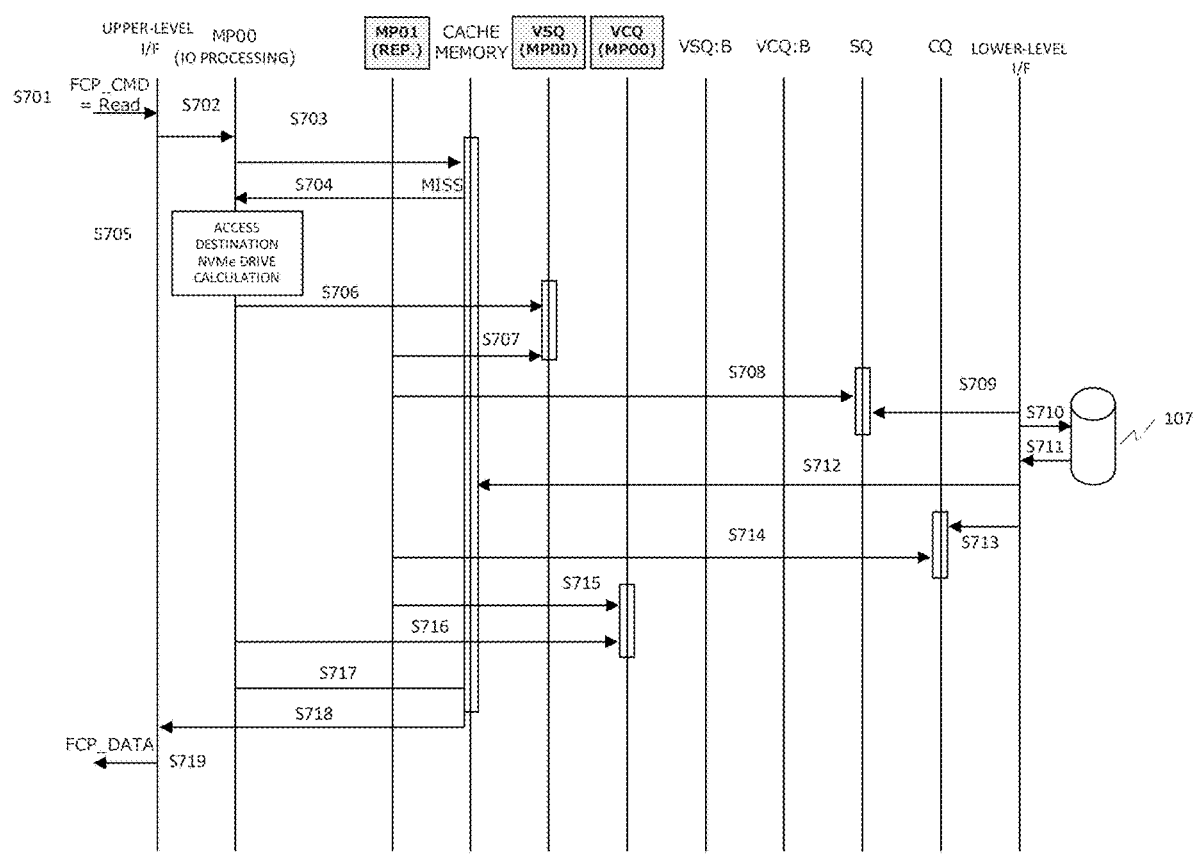
FIG. 7 is a diagram illustrating a read sequence at the time of cache miss (straight)

FIG. 7 is a read sequence diagram at the time of cache miss in the case of storage transfer. With the cache miss determination, in the case of the cache miss, the operation is similar to that illustrated in FIG. 5. In FIG. 7, a process sequence will be described using the information of FIG. 13.

The upper-level I/F 202 receives the read command from the computer (S701). The upper-level I/F notifies an MP 00 of the receipt of the read command (S702). The MP 00 performs hit/miss determination of whether or not data requested to the cache memory by the read command is in the cache memory of its own controller (S703). In a case in which the cache hit occurs, data is read from the cache memory of its own controller, and a response is transmitted to the computer.

In a case in which the cache hit occurs, since data can be transferred from the cache memory to the computer without translating access destination logical address information such as the LUN included in the I/O request to physical address information specifying a drive or indicating a data storage position, it is not necessary to perform the address translation for each I/O request, and the I/O processing performance can be improved.

In a case in which the cache miss occurs (S704), the MP 00 calculates (specifies) the NVMe drive storing the data from the virtual address information such as the LUN included in the read command with reference to the storage configuration table of FIG. 14 (S705).

The MP 00 stores the read command in the VSQ allocated to itself (S706). At this time, the MP 00 that has received the read command can acquire the VSQ 1302 allocated to the MP 00 with reference to the queue management table illustrated in FIG. 13. Note that the queue management table of FIG. 13 managed for each NVMe drive can be selected on the basis of the NVMe drive specified with reference to the storage configuration table of FIG. 14.

If the NVMe drive of the access destination is specified by the storage configuration table of FIG. 14, since it is possible to comprehend the correspondence of VSQ/VCQ and SQ/CQ for each MP, whether or not it is the representative MP, and whether or not the I/O is processed by the controller to which the driver is PCI-connected through the queue management table managed for each NVMe drive, it is possible to determine whether or not the processing of the I/O is the storage transfer or the cross transfer.

Each MP polls the queue management table 2042 and determines whether or not it is the representative MP. Referring to FIG. 13, for example, when the MP number of the polling MP is [0] and the access destination of the read command is the NVMe drive ZZ, the representative flag 1309 is set [ON], and thus it becomes the representative MP. Similarly, in the case of the MP number [XX] of the polling MP, the MP of the MP number [XX] does not become the representative MP since the representative flag 1309 is [OFF]. FIG. 7 illustrates a case in which the MP number [01] becomes the representative MP, and the MP number [00] does not become the representative MP but an MP that performs the I/O processing.

The representative MP reaps the command from the VSQ for the MP 00 (S707) and enqueues it in the SQ (S708).

The command stored in the SQ is reaped by the NVMe drive 107 serving as the access destination (S709), the command is executed, and the data is read (S710 and S711). The read data is stored in the cache memory (S712), and the completion response is stored in the CQ (S713).

The representative MP reaps the completion response from the CQ (S714), and enqueues it in the VCQ for the MP 00 (S715). The MP 00 reaps the completion response from the VCQ for the MP 00 (S716), reads the read data from the cache memory, and transmits it to the upper-level I/F (S718). The upper-level I/F transmits the read data to the computer (S719).

Since the VCQ which is a virtual CQ allocated to each MP is disposed as described above, the exclusion control between MPs becomes unnecessary, and the I/O processing performance can be improved in the multi-node storage environment with a large number of MPs.

The I/O processing performance can be improved in the multi-node storage environment.

Further, in a case in which the cache hit occurs, since data can be transferred from the cache memory to the computer without translating access destination logical address information such as the LUN included in the I/O request to physical address information specifying the drive or indicating a data storage position, it is not necessary to perform the address translation for each I/O request, and the I/O processing performance can be improved.

In other words, even though the MP (the I/O processing MP) of the controller to which the NVMe drive storing the data of the read request is not PCI-connected is processed, when there is data in the cache memory of the controller in which the I/O processing MP is accommodated and the cache hit occurs, it is possible to quickly respond to the I/O request. In this case, since it is not necessary to translate the virtual address information such as the LUN included in the I/O request into the physical address information specifying the drive or the like, the I/O processing speed can be increased. Further, since the MP is released from the unnecessary address translation, resources of the MP can be effectively used for other processing.

<Cross Transfer Sequence>

Figure 8:
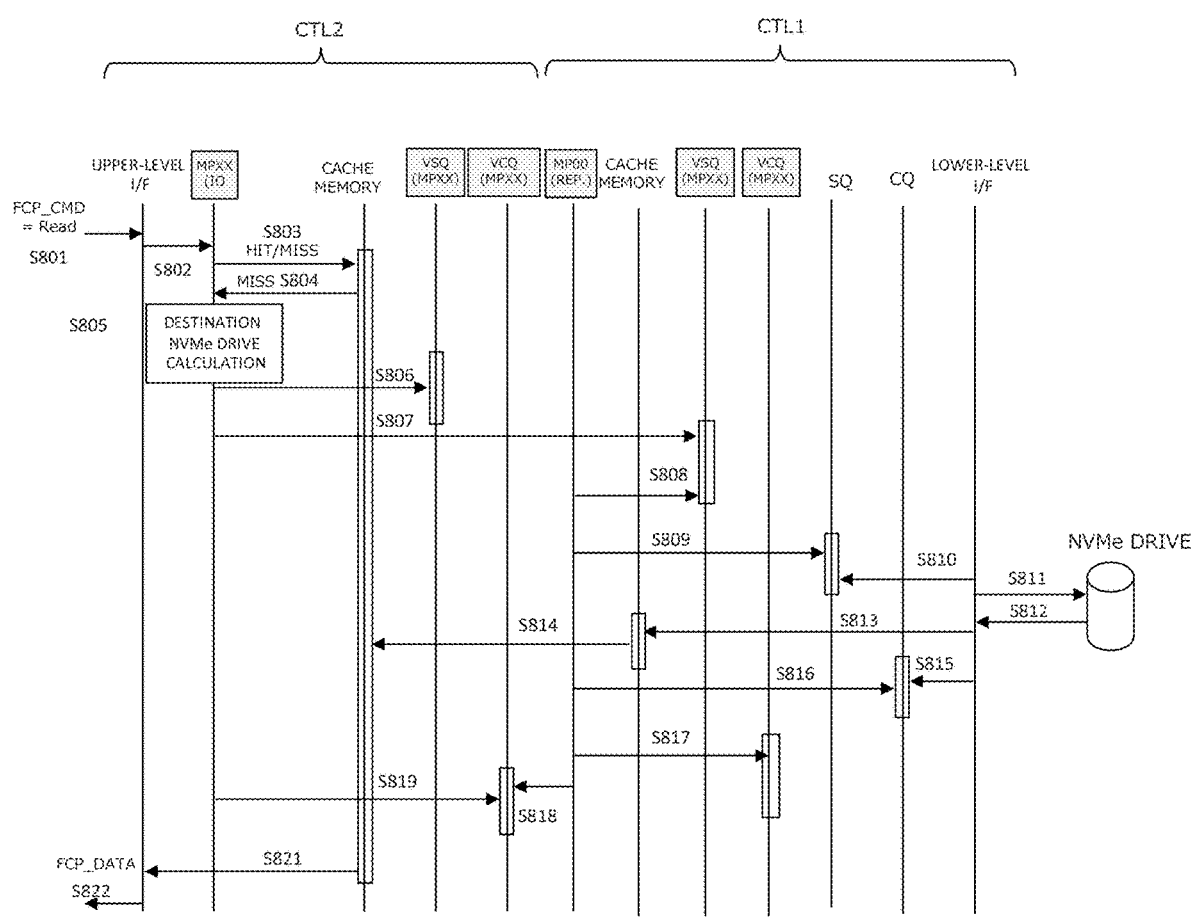
FIG. 8 is a diagram illustrating a read sequence at the time of cache miss (cross)

FIG. 8 is a diagram illustrating a read sequence at the time of cache miss (cross). FIG. 8 is a sequence diagram in which description of cache hit determination is added to the operation of the cross of FIG. 6. In FIG. 8, a process sequence will be described using the information of FIG. 13.

The upper-level I/F 202 receives the read command from the computer (S801). The upper-level I/F notifies the MP XX of the receipt of the read command (S802). The MP XX that has received the notification becomes an MP that performs the I/O processing. The MP XX performs hit/miss determination of whether or not data requested to the cache memory by the read command is in the cache memory of its own controller (S803). In a case in which the cache hit occurs, data is read from the cache memory of its own controller, and a response is transmitted to the computer.

In a case in which the cache hit occurs, since data can be transferred from the cache memory to the computer without translating access destination logical address information such as the LUN included in the I/O request to physical address information specifying a drive or indicating a data storage position, it is not necessary to perform the address translation for each I/O request, and the I/O processing performance can be improved.

In a case in which the cache miss occurs (S804), the MP XX calculates (specifies) the NVMe drive storing the data from the virtual address information such as the LUN included in the read command with reference to the storage configuration table of FIG. 14 (S805).

The MP XX stores the read command in the VSQ allocated to itself (S806). At this time, the MP XX that has received the read command can acquire the VSQ allocated to the MP XX with reference to the queue management table illustrated in FIG. 13. Note that the queue management table of FIG. 13 managed for each NVMe drive can be selected on the basis of the NVMe drive specified with reference to the storage configuration table of FIG. 14.

If the NVMe drive of the access destination is specified by the storage configuration table of FIG. 14, since it is possible to specify the correspondence of VSQ/VCQ and SQ/CQ for each MP, whether or not it is the representative MP, and whether or not the I/O is processed by the controller to which the driver is PCI-connected through the queue management table managed for each NVMe drive, it is possible to determine whether or not the processing of the I/O is the storage transfer or the cross transfer.

When it is the cross transfer, the MP XX stores a command in the use VSQ of another controller (CTL1) in accordance with the queue management table of FIG. 13 (S807). The representative MP of another controller 1 reaps the command from the use VSQ (S808) and enqueues it in the SQ (S809).

The command stored in the SQ is reaped by the NVMe drive 107 as the access destination, the command is executed, and the data is read (S811 and S812).

The read data is stored in the cache memory of the controller 1 (S813), and is DMA-transferred to the cache memory of the controller 2 (S814). Further, the completion response is stored in the CQ (S815).

The representative MP of the controller 1 reaps the completion response from the CQ (S816) and enqueues it in the VCQ of the controller 1 and the VCQ for the MP XX of the controller 2 (S817 and S818). The MP XX reaps the completion response from the VCQ for the MP XX (S819), reads the read data from the cache memory, and transmits it to the upper-level I/F (S821). The upper-level I/F transmits the read data to the computer (S822).

In this way, in the multi-node storage environment, since the virtual queues (the VSQ and the VCQ) corresponding to each MP are disposed separately from the queues (the SQ and the CQ) disposed in the NVMe drive, the queue exclusion control becomes unnecessary, and the I/O processing performance can be improved.

Also, in the multi-node storage system in which a plurality of storage devices are connected via a network, only when cache miss occurs, a command is transferred (cross-transferred) to a storage device to which a NVMe drive serving as an access destination is connected, and thus the I/O processing performance can be improved.

In other words, even though the MP (the I/O processing MP) of the controller to which the NVMe drive storing the data of the read request is not PCI-connected is processed, when there is data in the cache memory of the controller in which the I/O processing MP is accommodated and the cache hit occurs, it is possible to quickly respond to the I/O request. In this case, since it is not necessary to translate the virtual address information such as the LUN included in the I/O request into the physical address information specifying the drive or the like, the I/O processing speed can be increased. Further, since the MP is released from the unnecessary address translation, resources of the MP can be effectively used for other processing.

<Process Flow>

Figure 9:
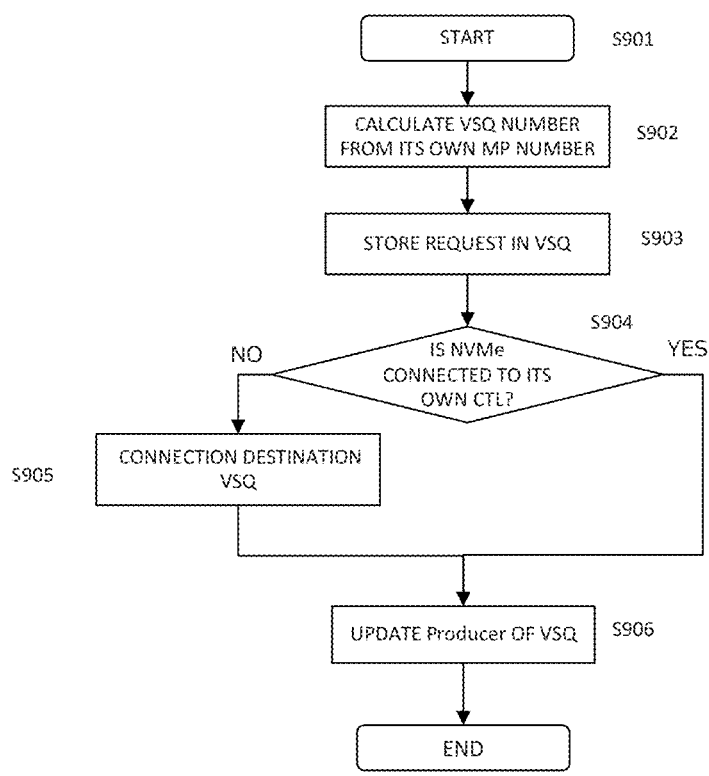
FIG. 9 is a diagram illustrating a VSQ storage process flow when an IO request is received.

FIG. 9 is a diagram illustrating a VSQ storage process flow when the IO request is received. This process flow is realized as the MP executes the MP processing program 2045. If the I/O request is received, the access destination drive is specified from the LUN or the like included in the I/O request with reference to the storage configuration table of FIG. 14 (S901).

If the access destination drive is specified, the queue management table of FIG. 14 is read, and the number of corresponding VSPs is acquired from the number of the MP (its own MP) that has received the I/O request (S902).

The MP stores the command in the VSP of the acquired number (S903), and determines whether or not the access destination drive (the NVMe drive) is connected to the controller (its own CTL) in which the MP is mounted (S904) with reference to the queue management table of FIG. 14 (1304). If the determination result indicates that the drive is not connected to its own CTL, the command is transferred to the controller to which the drive is connected (S905). Note that the transfer destination acquires the VSP of the drive to which the drive is connected on the basis of the use VSQ 1302 of the queue management table of FIG. 13. Finally, the value of the VSQ Producer is updated (S906).

Figure 10:
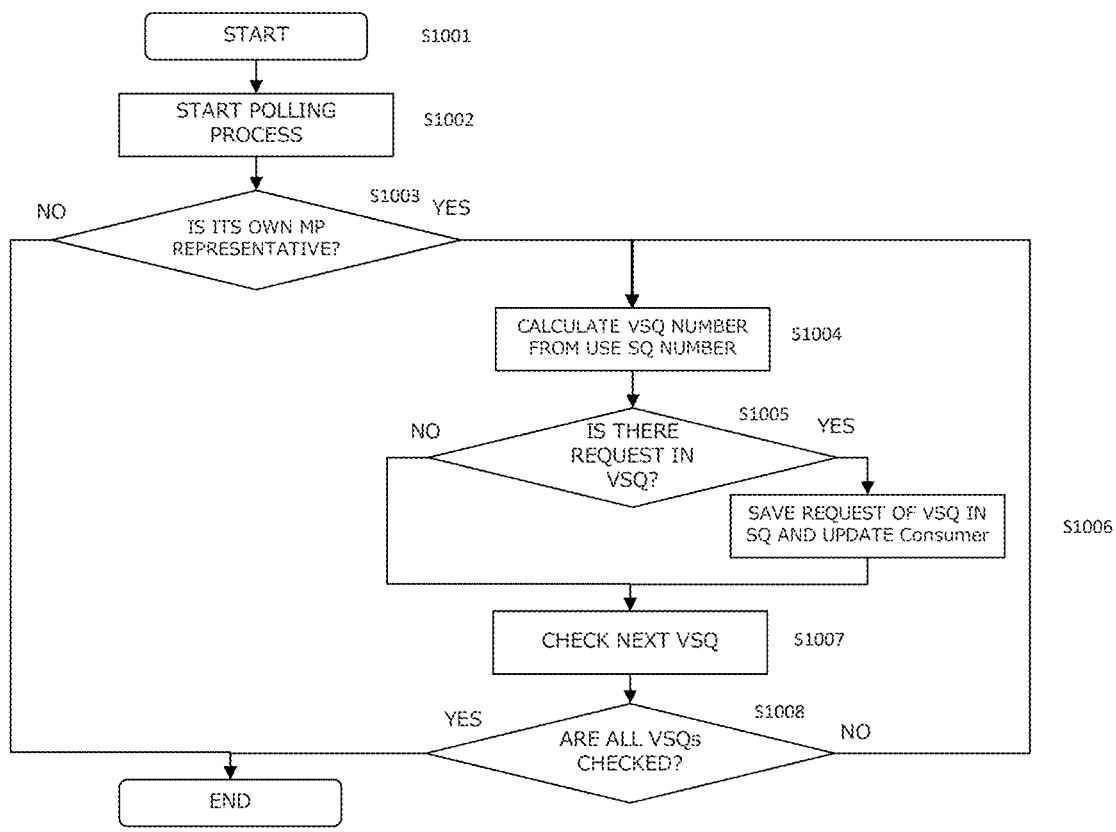
FIG. 10 is a diagram illustrating VSQ reaping and an SQ (request) storage process flow by a representative MP.

FIG. 10 is a diagram illustrating a VSQ reaping and SQ (request) storage process flow by the representative MP.

Each MP starts the polling process from the VSQ (S1002). The MP polls the representative flag 1309 of the queue management table of FIG. 13 which is information for managing that it is the MP representatively storing the request from the VSQ to the SQ (or from the CQ to the VCQ), and determines whether or not the MP itself is a representative MP (S1003).

If it is determined that the MP itself is not a representative MP, the MP ends the process, and if it is determined that the MP itself is a representative MP, the process proceeds to step S1004. The VSQ number is calculated from the use SQ number of the queue management table (S1004). It is determined whether or not there has already been a request in the VSQ (whether or not a command is stored) (S1005), and if there is a request, the process proceeds to step S1006, and if there is no request, the process proceeds to step S1007.

When the command is stored in the VSP, the command is saved in the SQ, and the value of the Consumer is updated (S1006). In step S1007, a next VSQ is checked (S1007), and if all VSPs are checked, the process ends, and if there is an unchecked VSP, the process returns to step S1004, and the process is continued (S1008).

Figure 11:
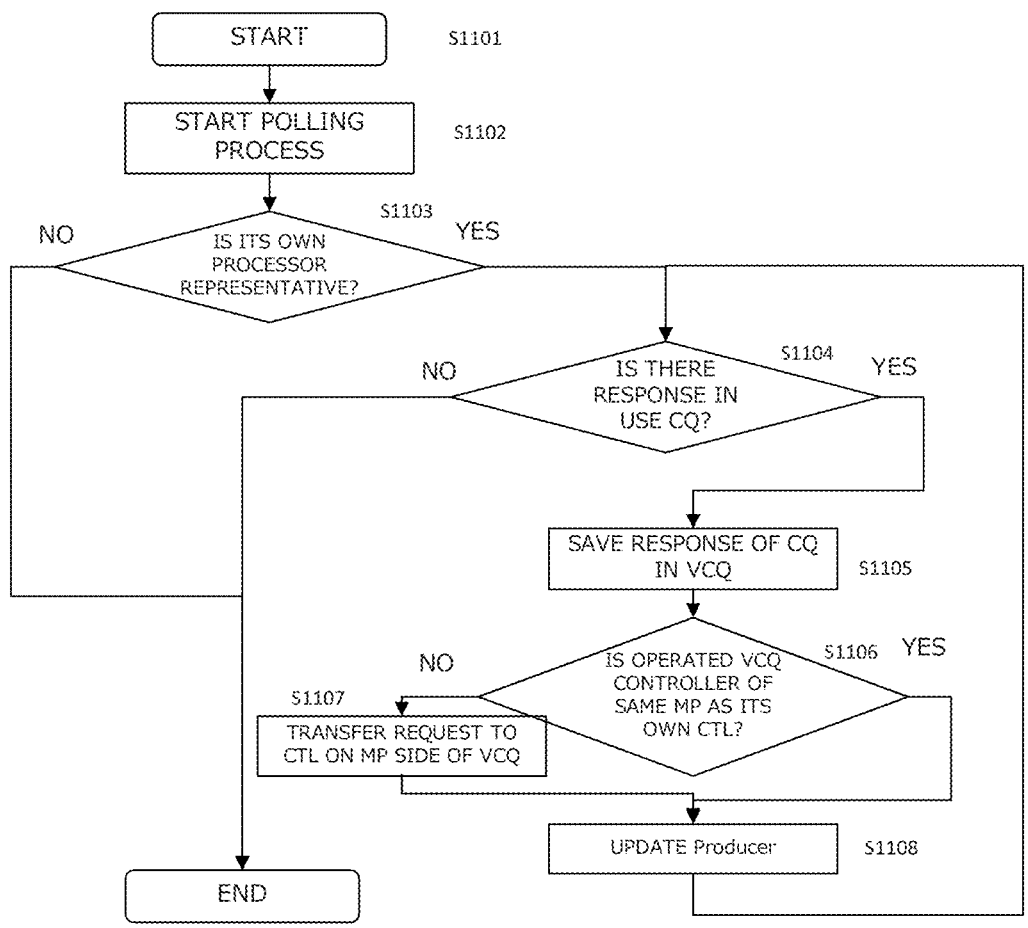
FIG. 11 is a diagram illustrating CQ (response) reaping and VCQ storage (between crosses) process flow by a representative MP.

FIG. 11 is a diagram illustrating CQ (response) reaping and VCQ storage (between crosses) process flow by the representative MP. Similarly to step S1002 of FIG. 10, the MP starts the polling process (S1102). If the result of the polling process indicates that the MP itself is a representative MP, the process proceeds to step S1104, and if the result indicates that the MP itself is not a representative MP, the process ends.

In step S1104, it is determined whether or not there is a response in the use CQ (S1104), and if there is no response, the processing ends, and if there is a response, the response of the CQ is saved in the VCQ in accordance with the queue management table (S1105).

It is determined whether or not an operated VCQ is a controller in which the representative MP is accommodated (S1106). In the case of a different controller, the request (response) is transferred to another controller in which the use VCQ is accommodated (S1107). Finally, the value of the Producer is updated (S1108), and the process ends.

Figure 12:
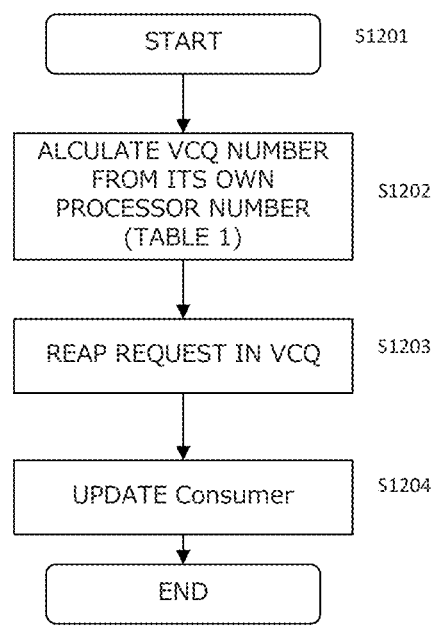
FIG. 12 is a diagram illustrating VCQ reaping and a response process flow.

FIG. 12 illustrates a VCQ reaping and response process flow. The MP performing the I/O processing calculates the VCQ number from its own MP number with reference to the queue management table of FIG. 13 (S1202). The MP performing the I/O processing reaps the request (response) from the calculated VCQ (S1203), and updates the value of the Consumer (S1204), and the process ends.

According to the present embodiment, since the VSQ which is a virtual SQ allocated to each MP is disposed for all the MPs of the multi-node storage system as described above, the exclusion control between MPs becomes unnecessary, and the I/O processing performance can be improved in the multi-node storage environment with a large number of MPs.

Further, in a case in which the cache hit occurs, since data can be transferred from the cache memory to the computer without translating access destination logical address information such as the LUN included in the I/O request to physical address information specifying a drive or indicating a data storage position, it is not necessary to perform the address translation for each I/O request, and the I/O processing performance can be improved.

In other words, even though the MP (the I/O processing MP) of the controller to which the NVMe drive storing the data of the read request is not PCI-connected is processed, when there is data in the cache memory of the controller in which the I/O processing MP is accommodated and the cache hit occurs, it is possible to quickly respond to the I/O request. In this case, since it is not necessary to translate the virtual address information such as the LUN included in the I/O request into the physical address information specifying the drive or the like, the I/O processing speed can be increased. Further, since the MP is released from the unnecessary address translation, resources of the MP can be effectively used for other processing.

Further, with the cache hit determination, the cross transfer of the multi-node storage system can be reduced, and the bandwidth of the network constituted by the ISW and the like can be effectively used.

The I/O processing performance can be improved because the command is transferred (cross-transferred).

Further, in the case of the cross transfer, since the command is transferred to the virtual queue of the storage device of the transfer destination in accordance with the NVMe, it is not necessary to perform the address translation in the storage device of the transfer destination as compared with the I/O request using the virtual address such as the LUN between the storage devices connected via the network, and thus the I/O processing performance can be improved.

What is claimed is:

1. A multi-node storage system including a plurality of nodes providing a volume to a computer as a logical storage area, each node including a controller that processes an I/O request from the computer, the multi-node storage system comprising:
 a plurality of NVMe drives PCI-connected to any one of the controllers of the node; and
 a switch that connects the controllers of the plurality of nodes to each other,
 wherein the controller includes a plurality of processors that process the I/O request from the computer and a memory, and
 the memory includes, for the plurality of NVMe drives,
 virtual queues which are equal in number to processors of a plurality of controllers constituting the multi-node storage system, and
 real queues that store a command in any one of the plurality of NVMe drives and that are smaller in number than the virtual queues.

2. The multi-node storage system according to claim 1, wherein the virtual queue includes a VSQ that stores a command and a VCQ that stores a response,
 the real queue includes a SQ that stores a command and a CQ that stores a response,
 if a read request is received from the computer, a first processor of the plurality of processors stores the read request in a first VSQ allocated to the first processor,
 a representative processor accommodated in a first controller of the plurality of controllers which accommodates the first processor reaps the read request from the first VSQ, and stores the read request in a first SQ set in a first NVMe drive of the plurality of NVMe drives which stores target data of the read request, and
 the first NVMe drive reaps the read request stored in the first SQ and executes the read request.

3. The multi-node storage system according to claim 2, wherein, if the read request is executed, the first NVMe drive stores a response in a CQ of the first controller and stores read data in a cache memory,
 the representative processor reaps the response stored in the first CQ, and stores the response in a first VCQ allocated to the first processor, and
 the first processor reaps the response stored in the first VCQ, and reads the read data from the cache memory.

4. The multi-node storage system according to claim 2, wherein, if the read request is received from the computer, the first processor determines whether or not data corresponding to the read request is stored in a cache memory before storing the read request in the first VSQ allocated to the first processor.

5. The multi-node storage system according to claim 1, wherein the virtual queue includes a VSQ that stores a command and a VCQ that stores a response,
 the real queue includes a SQ that stores a command and a CQ that stores a response,
 a first processor of the plurality of processors
 calculates an access destination NVMe drive from the read request if the read request is received from the computer, and when the calculated NVMe drive is PCI-connected to a second controller other than the first controller accommodating the first processor, stores the read request in a second VSQ of the second controller allocated to the first processor, a representative processor accommodated in the second controller reaps the read request from the second VSQ, and stores the read request in a second SQ set in a second NVMe drive of the plurality of NVMe drives storing target data of the read request, and the second NVMe drive reaps the read request stored in the second SQ and executes the read request.

6. The multi-node storage system according to claim 5, wherein, if the read request is executed, the second NVMe drive stores a response in a second CQ and stores read data in a cache memory of the second controller and a cache memory of the first controller, a representative processor of the second controller reaps the response stored in the second CQ, and stores the response in a first VCQ allocated to the first processor, and the first processor reaps the response stored in the first VCQ and reads the read data from the cache memory.

7. The multi-node storage system according to claim 5, wherein, if the read request is received from the computer, the first processor determines whether or not data corresponding to the read request is stored in a cache memory before storing the read request in the first VSQ allocated to the first processor.

8. The multi-node storage system according to claim 1, wherein the memory includes a storage configuration table that manages a correspondence between a logical address included in an I/O request and an NVMe drive in which data is stored, a queue management table that manages a corresponding relation of a processor, a virtual queue, and a real queue and that a processor is a representative processor for the plurality of NVMe drives, a virtual queue area in which the virtual queue is set, and a real queue area in which the real queue is set.

9. A queue control method of a multi-node storage system including a plurality of nodes providing a volume to a computer as a logical storage area, each node including a controller that processes an I/O request from the computer, the multi-node storage system including a plurality of NVMe drives PCI-connected to any one of the controllers of the node; and a switch that connects the controllers of the plurality of nodes to each other, wherein the controller includes a plurality of processors that process the I/O request from the computer and a memory, and the memory includes, for the plurality of NVMe drives, virtual queues which are equal in number to processors of a plurality of controllers constituting the multi-node storage system, and real queues that store a command in the plurality of NVMe drives and that are smaller in number than the virtual queues, the virtual queue including a VSQ that stores a command and a VCQ that stores a response, the real queue including a SQ that stores a command and a CQ that stores a response, the queue control method comprising:

if a read request is received from the computer, storing, by a first processor of the plurality of processors, the read request in a first VSQ allocated to the first processor;

reaping, by a representative processor accommodated in a first controller of the plurality of controllers which accommodates the first processor, the read request from the first VSQ, and storing the read request in a first SQ set in a first NVMe drive of the plurality of NVMe drives which stores target data of the read request; and reaping, by the first NVMe drive, the read request stored in the first SQ and executing the read request.

10. A queue control method of a multi-node storage system including a plurality of nodes providing a volume to a computer as a logical storage area, each node including a controller that processes an I/O request from the computer, the multi-node storage system including a plurality of NVMe drives PCI-connected to any one of the controllers of the node; and a switch that connects the controllers of the plurality of nodes to each other, wherein the controller includes a plurality of processors that process the I/O request from the computer and a memory, and the memory includes, for the plurality of NVMe drives, virtual queues which are equal in number to processors of a plurality of controllers constituting the multi-node storage system, and real queues that store a command in the plurality of NVMe drives and that are smaller in number than the virtual queues, the virtual queue including a VSQ that stores a command and a VCQ that stores a response, the real queue including a SQ that stores a command and a CQ that stores a response, the queue control method comprising:

if the read request is received from the computer, calculating, by a first processor of the plurality of processors, an access destination NVMe drive from the read request if the read request is received from the computer;

when the calculated NVMe drive is PCI-connected to a second controller other than the first controller accommodating the first processor, storing the read request in a second VSQ of the second controller allocated to the first processor;

reaping, by a representative processor accommodated in the second controller, the read request from the second VSQ, and storing the read request in a second SQ set in a second NVMe drive of the plurality of NVMe drives storing target data of the read request; and reaping, by the second NVMe drive, the read request stored in the second SQ and executing the read request.

* * * * *